US011546136B2

(12) United States Patent
Ippatapu et al.

(10) Patent No.: US 11,546,136 B2
(45) Date of Patent: Jan. 3, 2023

(54) GENERATING SHARED AUTHENTICATION KEYS USING NETWORK CONNECTION CHARACTERISTICS

(71) Applicant: EMC IP Holding Company LLC, Hopkinton, MA (US)

(72) Inventors: Venkata L. R. Ippatapu, Westborough, MA (US); Kenneth Dorman, West Brookfield, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 258 days.

(21) Appl. No.: 16/552,658

(22) Filed: Aug. 27, 2019

(65) Prior Publication Data

US 2021/0067325 A1 Mar. 4, 2021

(51) Int. Cl.
*H04L 9/08* (2006.01)
*H04W 12/06* (2021.01)

(52) U.S. Cl.
CPC ........... *H04L 9/0819* (2013.01); *H04W 12/06* (2013.01); *H04L 2209/24* (2013.01)

(58) Field of Classification Search
None
See application file for complete search history.

(56) References Cited

U.S. PATENT DOCUMENTS

| 7,234,058 | B1* | 6/2007 | Baugher | H04L 9/0833 |
| | | | | 380/259 |
| 10,083,311 | B2* | 9/2018 | Nordback | G06F 21/6209 |
| 10,484,348 | B1* | 11/2019 | Levin | G06F 16/156 |
| 2009/0052663 | A1* | 2/2009 | Hammond | H04L 9/0838 |
| | | | | 380/44 |
| 2011/0206206 | A1* | 8/2011 | Blom | H04L 63/06 |
| | | | | 380/279 |
| 2012/0117248 | A1* | 5/2012 | Weis | H04L 63/06 |
| | | | | 709/227 |
| 2013/0236007 | A1* | 9/2013 | Munro | H04L 9/0861 |
| | | | | 380/44 |
| 2016/0352525 | A1* | 12/2016 | Antipa | H04L 9/0618 |
| 2018/0013559 | A1* | 1/2018 | Hassan | H04L 9/0875 |
| 2018/0276408 | A1* | 9/2018 | Eigner | G06F 21/6227 |
| 2019/0097794 | A1* | 3/2019 | Nix | H04L 9/0662 |
| 2020/0265146 | A1* | 8/2020 | Al-Yousef | G06F 11/1471 |

* cited by examiner

*Primary Examiner* — Bassam A Noaman
(74) *Attorney, Agent, or Firm* — min, Turocy & Watson, LLP

(57) ABSTRACT

The described technology is generally directed towards generating shared authentication keys using network connection characteristics. According to an embodiment, a system can comprise a processor and a memory that can store executable instructions that, when executed by the processor, facilitate performance of operations. The operations can comprise generating a first authenticator based on a first authentication key generated based on a first connection characteristic of the first device and a second connection characteristic of a second device. The operations can further comprise incorporating the first authenticator into first content for authentication by the second device employing a second authentication key, generated by the second device based on the first connection characteristic and the second connection characteristic. The operations can further comprise establishing, based on the first content, a connection with the second device.

19 Claims, 10 Drawing Sheets

GENERATING SHARED AUTHENTICATION KEYS USING NETWORK CONNECTION CHARACTERISTICS

TECHNICAL FIELD

The subject application generally relates to computer networks, and, for example, to authenticating and secure connections between computers, and related embodiments.

BACKGROUND

As the use of computer networks increases, the importance of authenticating network communications before establishing a communication continues to increase. One way of authenticating network communications is by using a single key on both a source and destination device, e.g., when communications include an authenticator generated by the source device using the key, the destination device can verify the authenticator using the key. This same approach can be used for encrypting communications as well.

Problems can occur however, based on the sharing of the keys with both the source and destination systems. This sharing process can, in some circumstances, introduce security vulnerabilities based on different factors, including a potential interception of the keys by third parties.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a processor and a memory that can store executable instructions that, when executed by the processor, facilitate performance of operations. The operations can comprise generating a first authenticator based on a first authentication key generated based on a first connection characteristic of the first device and a second connection characteristic of a second device. The operations can further comprise incorporating the first authenticator into first content for authentication by the second device employing a second authentication key, generated by the second device based on the first connection characteristic and the second connection characteristic. The operations can further comprise establishing, based on the first content, a connection with the second device. Further, the second connection characteristic can comprise a characteristic of a port of the second device used for the establishing the connection. Further, the second connection characteristic can comprise hardware slot configuration information for a component of the second device used for the establishing the connection. Further, the operations further comprise authenticating, by employing the first authentication key, second content incorporating a second authenticator received via the connection, and wherein the second authenticator was incorporated into the second content by the second device employing the second authentication key.

In the embodiment described above, the operations can further comprise detecting a change in at least one of the first connection characteristic or the second connection characteristic, resulting in a modified connection characteristic, and changing the first authentication key based on the modified connection characteristic, resulting in a changed first authentication key. In the embodiment, the operations can further comprise notifying the second device regarding at least one of the modified connection characteristic or the changed first authentication key. Further, the detecting the change can comprise receiving an indication of a changed second authentication key from the second device. Further, the incorporating the first authenticator into the first content can be further for verification, by the second device employing the second authentication key, that the first content was not modified after the first content was communicated by the first device.

According to another embodiment, a computer-implemented method can comprise determining, by a first device comprising a processor a first configuration setting of the first device and a second configuration setting of a second device. The method can further comprise generating, by the first device, a first key based on at least one of the first configuration setting and the second configuration setting. The method can further comprise verifying, by the first device employing the first key, that first content received via a connection was communicated by the second device employing a second key based on at least one of the first configuration setting and the second configuration setting. The method can further comprise communicating, by the first device employing the first key, second content to the second device via the connection for verifying, by the second device employing the second key, that the first device originated communication of the second content. Further, the second configuration setting can comprise a hardware characteristic of the second device. Further, the second configuration setting can comprise a device address of the second device in a network protocol. The method can further comprise detecting a change in at least one of the first configuration setting or the second configuration setting, resulting in a modified configuration setting, and regenerating the first key based on the modified configuration setting, resulting in a changed first key. Further, the detecting the change can comprise receiving an indication of a changed second configuration setting from the second device. Further, the verifying that the first content received via the connection was communicated by the second device can comprise identifying an authenticating portion of the first content, and employing the first key to verify the authenticating portion. The method can further comprise, verifying, by the first device employing the first key, that the first content received via the connection was not modified after the first content was communicated by the second device.

According to another embodiment, a computer program product is provided. The computer program product can comprise machine-readable storage medium comprising executable instructions that, when executed by a processor, can facilitate performance of operations comprising storing, via a first connection, content in the first storage array device. The operations can further comprise replicating the content from the first storage array device to a second storage array device via a second connection established between the first storage array device and the second storage array device, by employing a first authentication key based on a first connection characteristic of the first storage array and a second connection characteristic of the second storage array, wherein the replicating the content to the second storage array enables the second storage array device of the second storage array to authenticate the content by employing a second authentication key generated based on the first connection characteristic and the second connection characteristic.

In another embodiment, the replicating the content to the second storage array device can further enable the second storage array device to verify, by employing the second authentication key, that the content was not modified during the replicating of the content. In the embodiment described above the operations can further comprise, receiving an indication that the content was replicated by the first storage array by employing the first authentication key and was authenticated by the second storage array by employing the second authentication key. Further, the first connection characteristic of the first storage array can comprise a third connection characteristic of the first connection to the device.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed towards facilitating generating shared authentication keys using network connection characteristics. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein employ hardware and/or software to solve problems that are highly technical in nature (e.g., determining and processing values derive from complex system settings), that are not abstract and cannot be performed as a set of mental acts by a human. For example, a human, or even a plurality of humans, cannot efficiently, accurately and effectively, manually generate and apply encryption keys based on complex system characteristics, with the same level of accuracy and/or efficiency as the various embodiments described herein.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
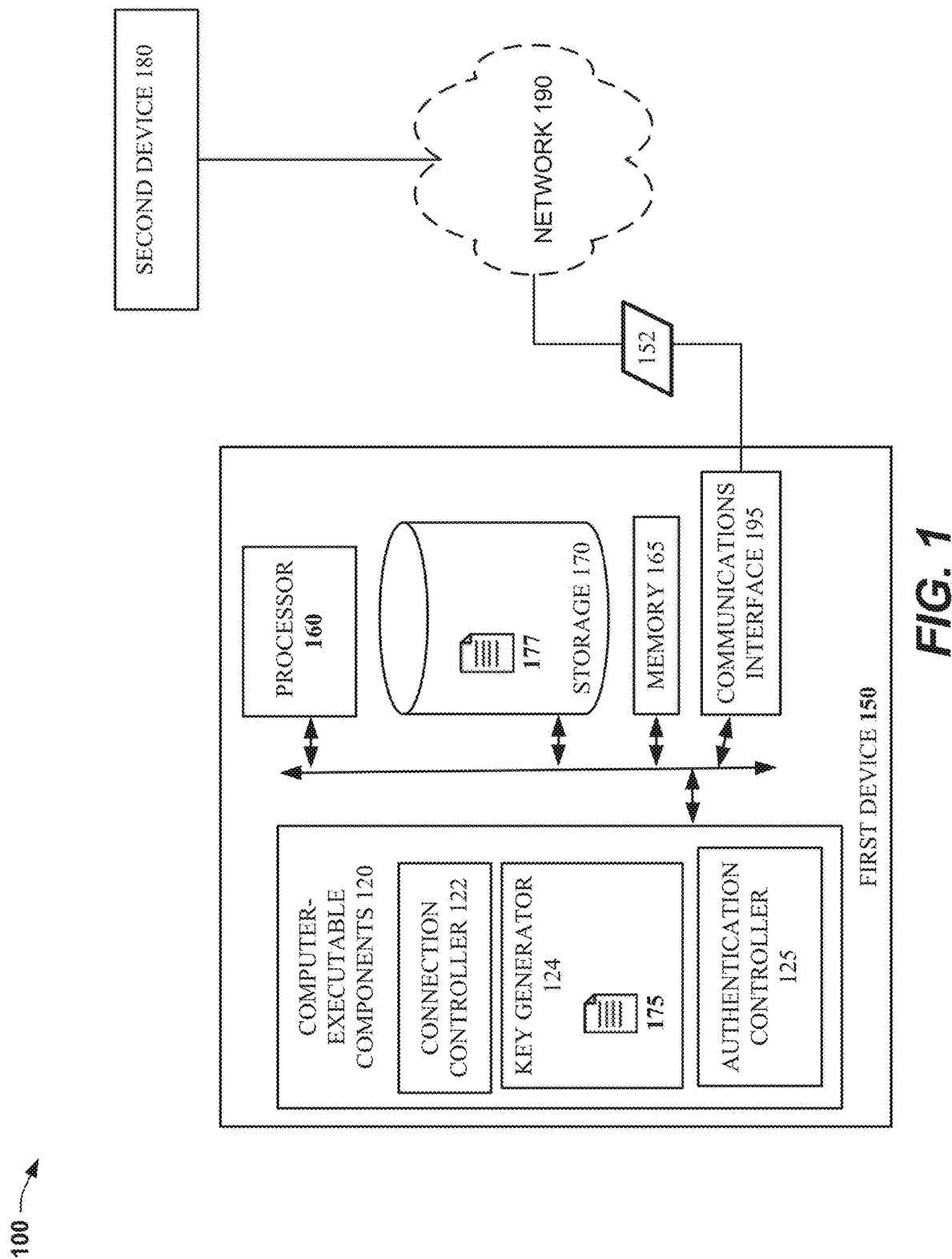
FIG. 1 illustrates a block diagram of an example, non-limiting system that can facilitate generating shared authentication keys using network connection characteristics, in accordance with various aspects and implementations of the subject disclosure.

FIG. 1 illustrates a block diagram of an example, non-limiting system 100 that can facilitate generating shared authentication keys using network connection characteristics, in accordance with various aspects and implementations of the subject disclosure.

In one or more embodiments, system can comprise memory 116 that stores computer executable components and processor 160 that can execute the computer executable components stored in the memory. As discussed further below with FIG. 10, in some embodiments, memory 116 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 116 are described below with reference to system memory 1016 and FIG. 10. Such examples of memory 116 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored on memory 116. For example, processor 160 can perform various operations that can be specified by such computer and/or machine readable, writable, and/or executable components and/or instructions including, but not limited to, logic, control, input/output (I/O), arithmetic, and/or the like.

In one or more embodiments, memory 165 can store computer-executable instructions 120 that, when executed by processor 160, can facilitate performance of operations, that include generating a first authenticator based on a first authentication key generated based on a first connection characteristic of first device 150 and a second connection characteristic of second device 180. The operations can further include incorporating the first authenticator into first content 152 for authentication by second device 180 employing a second authentication key, generated by the second device based on the first connection characteristic and the second connection characteristic. The operations can further include establishing, based on first content 152, a connection with second device 180.

In other embodiments, processor 160 can execute the computer-executable instructions 120 stored in memory 116 that can implement component that include, but are not limited to, connection controller 122, key generator 124, and authentication controller 125. In one or more embodiments, key generator 124 can generate a first authenticator based on a first authentication key (e.g., first key 175) generated based on a first connection characteristic (e.g., system characteristics 177) of first device 150 and a second connection characteristic of second device 180. Authentication controller 125 can incorporate the first authenticator into first content 152 for authentication by second device 180 employing a second authentication key, generated by the second device based on the first connection characteristic and the second connection characteristic. Connection controller 122 can further establish, based on the first content 152, a connection with the second device, e.g., via network 190.

It should be noted that one or more embodiments are described as generating shared keys, e.g., a single key shared by first device 150 and second device 180 respectively for including an identity authenticator with network content (also termed 'signing' the content, and verifying that the identity authenticator corresponds to first device 150 (e.g., was 'signed' by first device 150 and not a third-party). One type of shared key using in some examples herein is a shared secret key for peer authentication before establishing a secure IKE channel, e.g., as described in the Internet Key Exchange (IKE) protocol. IKE is an IPsec (Internet Protocol Security) standard protocol used to negotiate and establish a secure communication link and run encrypted traffic across remote data facility (RDF) systems after successful authentication of RDF peers.

Generally speaking, one or more embodiments can utilize generated shared keys for peer authentication without having to distribute each key to the source and destination systems. In some approaches described herein, each system can generate the same shared key based on applying an algorithm to characteristics of one or both systems. Example characteristics discussed further below include port characteristics of one or both systems, IP addresses used by one or both systems, and other characteristics of the systems as well as the communications links between the systems. In some circumstances, approaches described herein can eliminate the sharing of keys using potentially insecure communications channels.

As described in some examples below, an example system that can benefit in some circumstances from the use of one or more embodiments, is a data protection system. In different implementations, data protection systems can copy host data from primary storage in computing device to secondary storage. For data protection systems that can utilize remote data replication, the systems can copy data from one geographical location to a remote secondary storage device located on a different location, e.g., for disaster recovery and fault tolerance. Example systems which can employ one or more of the approaches described with embodiments herein include, but are not limited to, symmetrical remote data facilities (SRDF) system provided by DELL EMC. Example storage array devices which can employ one or more of the approaches described with embodiments herein include, but are not limited to, PowerMax enterprise data storage array system provided by DELL EMC, Inc. It should be noted that one or more embodiments described herein can be used with both Ethernet and fiber channel RDF systems for peer authentication purposes prior to creating a secure channel.

Figure 2:
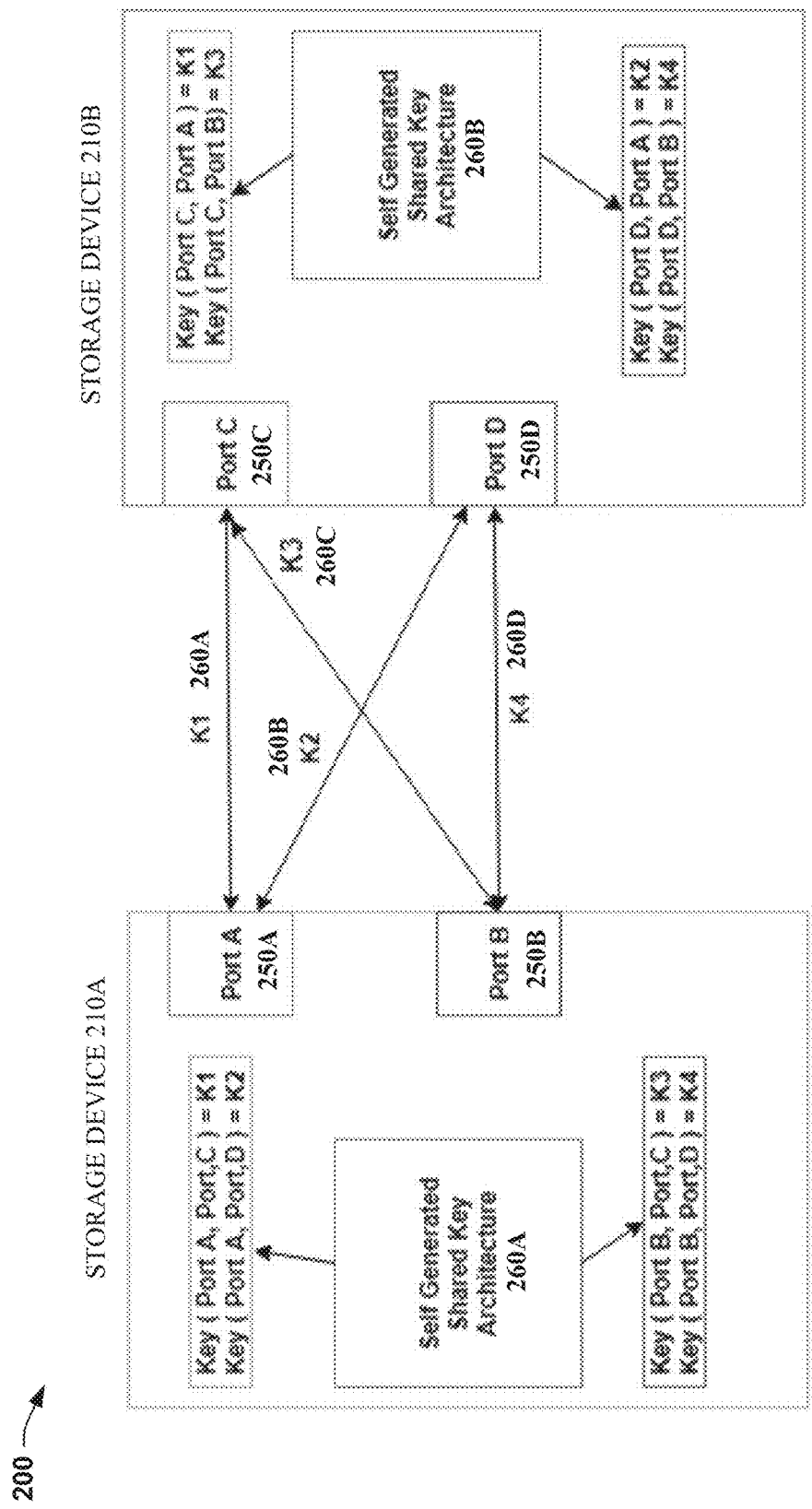
FIG. 2 is a block diagram illustrates the use of characteristics of multiple ports to facilitate self-generated shared key architectures for replicating data between storage device, in accordance with one or more embodiments.

FIG. 2 is a block diagram 200 illustrating the use of characteristics of multiple ports to facilitate self-generated shared key architectures for replicating data between storage devices, in accordance with one or more embodiments.

According to an example embodiment different approaches described herein are used to establish an authenticated connection between storage device 210A (e.g., an enterprise storage area network (SAN)) and storage device 210B (e.g., a remote data facility (RDF)) for replication of the contents of the SAN.

In one or more embodiments depicted in FIG. 2, before establishing connections between ports for replication, local storage device 210A and remote storage device 210B can each internally generate identical secret keys based on characteristics of both storage devices 210A-B, e.g., each respective key generated is based on, for example a characteristic of the generating system and a characteristic of the other system, with the same characteristics being used by both storage devices 210A-B to use the same algorithm to generate identical keys.

In the example depicted in FIG. 2, the characteristic utilized are values corresponding to port information on both systems, e.g., every port can have characteristics that can include, but are not limited to, IP address, port number, hardware inserted slot, and other similar characteristics. For example, an authentication key (e.g., K1 260A) can be generated by a combination of values, e.g., values corresponding to port 250A of storage device 210A and port 250C of storage device 210B. It should be noted that both self-generated shared key architectures 260A-B can each use the above noted ports to generate key K1 260A.

Notwithstanding other keys 260B-D depicted in FIG. 2, in one or more embodiments, it should further be noted that generated key K1 260A can be the only key generated and utilized to communicate between all of the port combinations shown, e.g., not just from port 250A to port 250C as shown. Keys 260B-D are discussed with FIG. 5 below, these keys being combined together, in one or more embodiments to improve security and generate keys of different lengths.

In the previously described example, both storage devices 210A-B are described as being able to generate 'identical' keys, with one key being able to authenticate content and the other key being able to verify authentication content. It should be noted that, as long as each system generates keys that have symmetrical functions, they need not be identical.

Benefits of the approaches described above include, but are not limited to, generating highly entropic keys that, in some circumstances, need never be exposed outside the storage devices in which they were generated.

Figure 3:
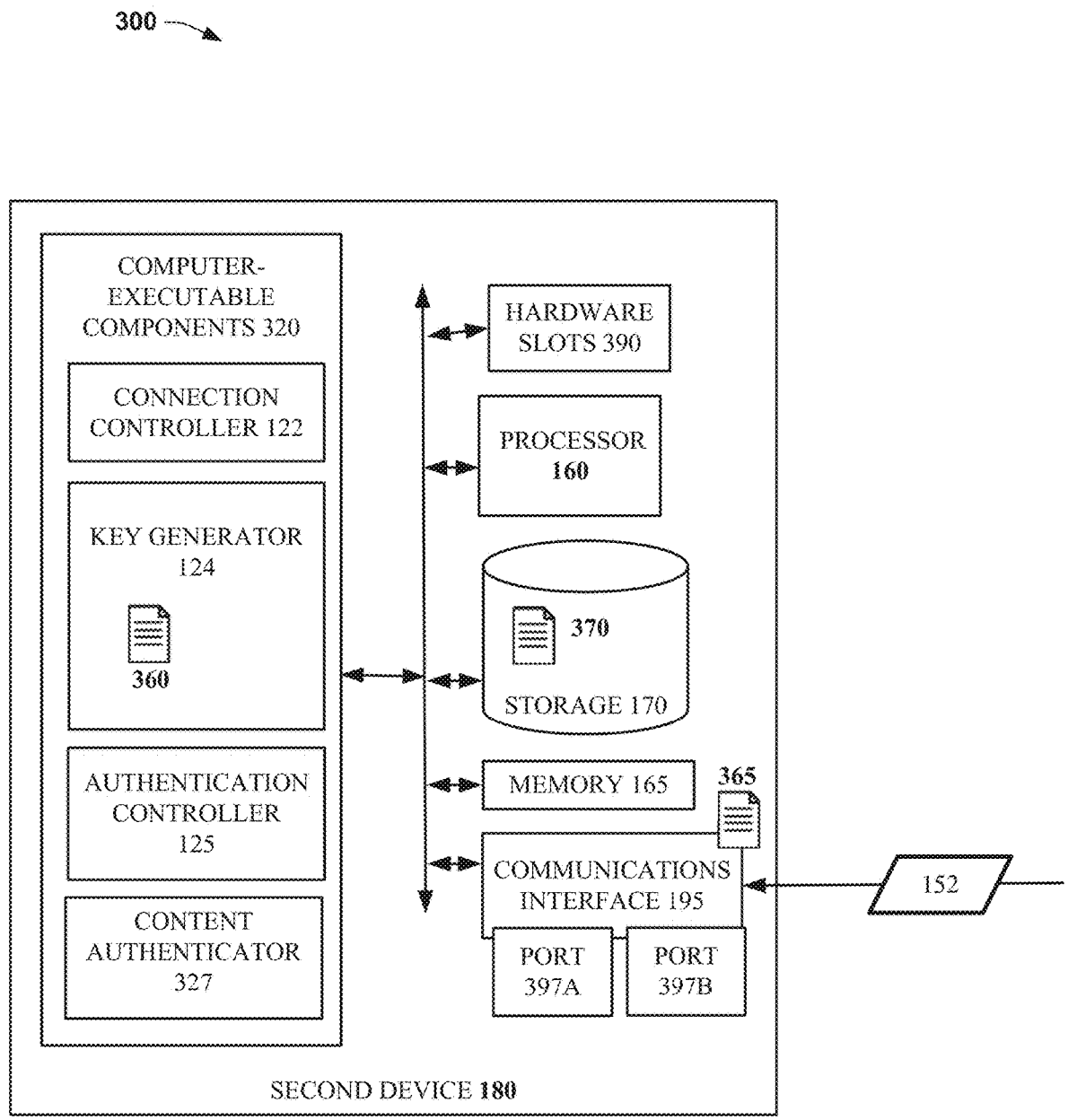
FIG. 3 includes a block diagram illustrating sample components of an example implementation of destination device 180, in accordance with one or more embodiments.

FIG. 3 includes a block diagram 300 illustrating sample components of an example implementation of destination second device 180, in accordance with one or more embodiments.

As described above, in one or more embodiments, second device 180 can use local configuration settings 365 as well as configuration settings 170 of first device 150 to generate a second key 360 that is symmetrical to a first key 175 generated by key generator 124 at first device 150, based on the same system characteristics information. In this example, for this second key 360, local configuration settings for second device 180 can be retrieved from local components, e.g., communications interface 195 retrieving information about ports 397A-B of second device 180. In one or more embodiments, because second device 180 does not have direct access to configuration settings of first device 150, some settings of first device 150 used to generate the local keys can be stored as configuration settings 370 in storage 160. In addition, the local configuration data can be stored for use and available as local configuration data 365. In one or more embodiments, this configuration information for first device 150 can be configuration information that enable the connection between the devices, e.g., IP addresses, port connection information.

In additional or alternative embodiments, information about first device 150 can be used for generating authentication keys without being used for establishing the connection, e.g., module slot information of first device 150 and other characteristics of first device 150 that are not necessary for connection to first device 150. Example configuration settings 370 are described below with FIG. 4, these settings also being termed herein: system characteristics, communications link characteristics, communication characteristics, and other similar terms. In one or more embodiments, first device 150 configuration settings 370 can be combined by key generator 124 with local configuration settings 365 to generate second key 360.

In this example, as noted above, second key 360 generated by second device 180 can be used to verify the source of first content 152 of verifying, by the first device employing the first key 175, that first content received via a connection was communicated by the second device employing a second key based on at least one of the first configuration setting and the second configuration setting.

In one or more embodiments, second device 180 can include one or more of the computer-executable components of FIG. 1, as well as content authenticator 327. In one or more embodiments, content authenticator 327 can be used by second device 180 to authenticate the content of first content 152 using the generated authentication key.

Figure 4:
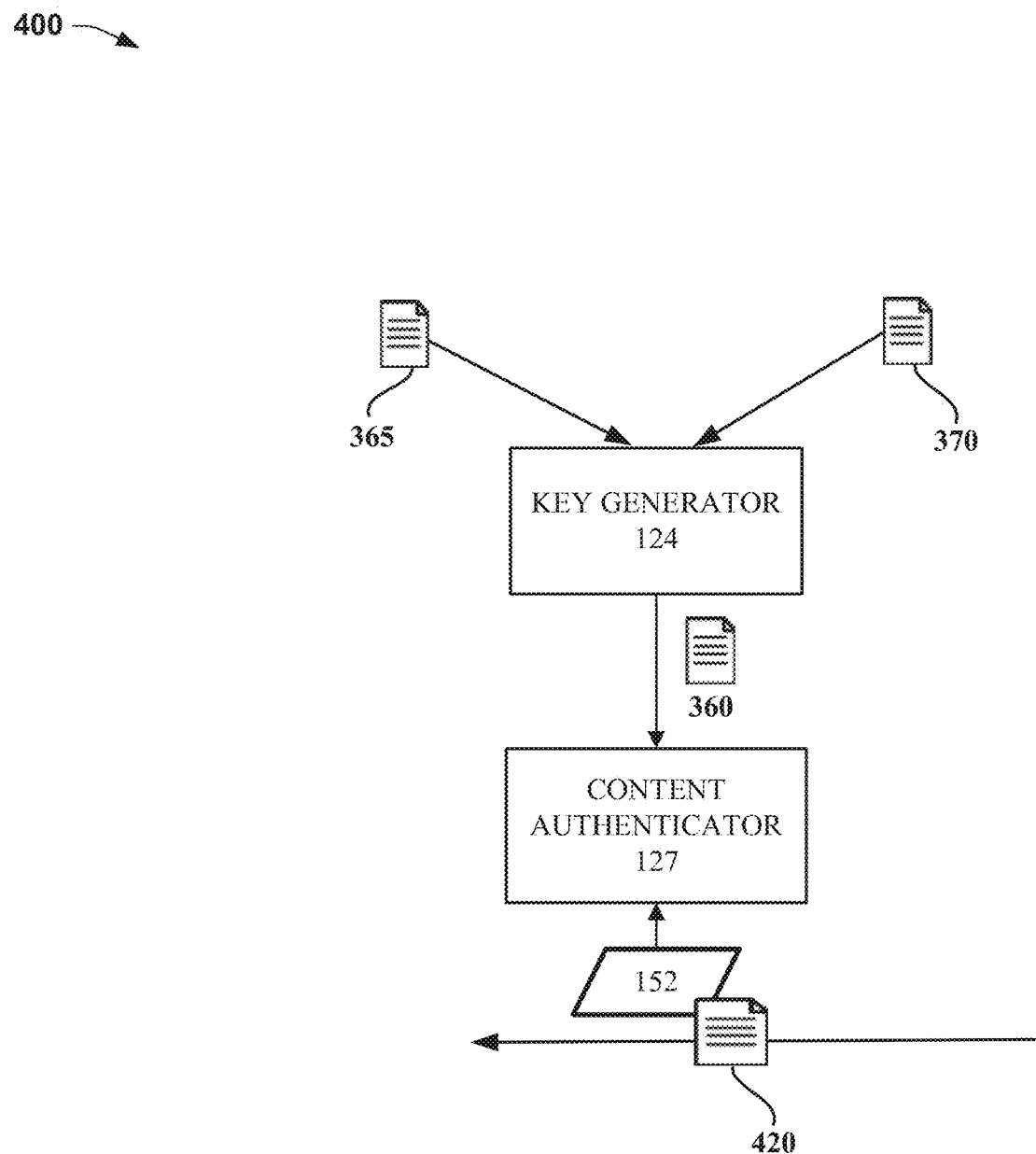
FIG. 4 illustrates that the combination of characteristics of both first device 150 and second device 180 can be used by individual devices to generate a key for content authentication, in accordance with one or more embodiments.

FIG. 4 provides an illustration 400 that the combination of characteristics of both first device 150 and second device 180 can be used by individual devices to generate a key for content authentication, in accordance with one or more embodiments. Repetitive description of like elements and/or processes employed in respective embodiments is omitted for sake of brevity.

As noted above, system characteristics (e.g., local configuration settings and stored configuration settings 370) can be used by key generator 127 to independently generate shared keys for authentication and encryption. Different local configuration settings 365 of second device 180 that can be used by one or more embodiments to generate second key 360 include, but are not limited to: local RDF Port information (e.g., ports 397A-B), system ID/serial number of local storage array (e.g., second device 180), local port number, local port IP address, local port world wide name (WWN), local RF input/output module slot information (e.g., director ID), and date and time information. Different first device 150 configuration settings 370 that can be used by second device 180 to generate second key 360 include, but are not limited to, first device 150 storage array system, ID/serial number, first device 150 port numbers utilized, first device 150 port IP address/local port WWN, input/output RDF module slot information (e.g., director ID), and date and time information.

In one or more embodiments, the above-noted configuration information can be set when first device 150 and second device 180 are set up, or reconfigured. In one or more embodiments, as described above, certain configuration settings can be communicated to a destination device in order to have this information available for key generation, e.g., first device configuration settings 370.

The example of FIG. 4 also depicts the use of second key 360 by content authenticator 327 to validate an authentication indicator of first content 152 generated by first device 150 and attached to content 420.

Figure 5:
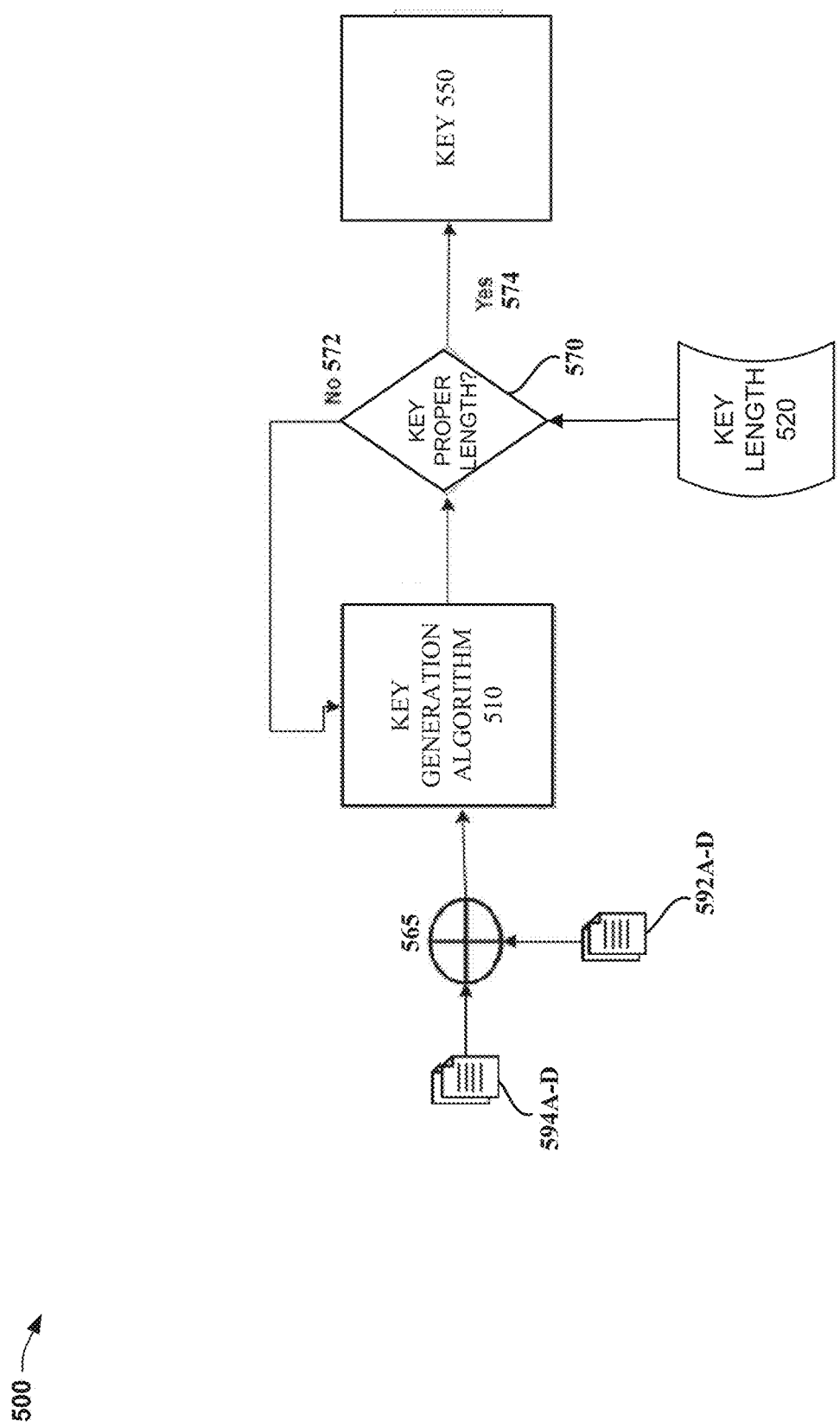
FIG. 5 depicts a flow diagram of the generation of an authentication key based on multiple combined system characteristics and truncated key lengths, in accordance with one or more embodiments.

FIG. 5 depicts a flow diagram 500 of the generation of an authentication key based on multiple combined system characteristics and truncated key lengths, in accordance with one or more embodiments. Repetitive description of like elements and/or processes employed in respective embodiments is omitted for sake of brevity.

In addition to some of the embodiments described above, as depicted, key generation algorithm 510 can receive multiple local characteristics 594A-D and remote characteristics 592A-D. In an example, each of the groups of characteristics include system ID, port number utilized, IP address of port utilized with world-wide name, and a module slot in the device in which the RDF component is installed. In another example, returning discussion to FIG. 2, discussed above, this combination approach can be used to generate a key for communication between first device 150 and second device 180 that is based on local ports 250A-B and remote ports 250C-D.

In alternative embodiments, depicted in FIG. 2, characteristics of port pairs set to be connected between storage devices 210A-B can be used to generate a different key for communication using each pair of ports. For example, as depicted in FIG. 2, characteristics of port 250A and 250D can be used to generate key K2 260B, while characteristics of ports 250B-C can be used to generate a key K3 260C specifically for communication using this pair of ports.

In one or more embodiments, local characteristics 594A-D and remote characteristics 592A-D can be combined, e.g., by multiplexer 565, and relayed to key generation algorithm 510. One having skill in the relevant art(s), given the description herein, will appreciate that different key algorithms can be selected to share with both first device 150 and second device 180, for the creation of respective keys. For example, the characteristics noted can be combined and processed using cascaded hash functions.

In one or more embodiments, to promote a particular level of key security, a particular key length 520 can be specified to produce a key of a particular length, e.g., 256 bits. After the processing of local characteristics 594A-D and remote characteristics 592A-D is completed, in some circumstances at block 570 the generated key length is compared to key length 520. If the generated key is too small (e.g., No 572), then the generated key is returned to key generation algorithm 510 where another round of processing of local characteristics 594A-D and remote characteristics 592A-D can be performed. The result of this second round of processing can be concatenated to the key result of the first round, thereby resulting in a longer key. Upon checking again at block 570, if the generated key remains too short, then additional rounds can be performed to continue to lengthen the generated key.

After one or more rounds of key generation algorithm 510, a resulting key can be generated that corresponds to key length 520 (e.g., Yes 574), and this value can be produced as a final result. Alternatively, when a key is generated that is greater than key length 520, in one or more embodiments, the generated key can be truncated at the proper key length 520 and then produced as final.

Figure 6:
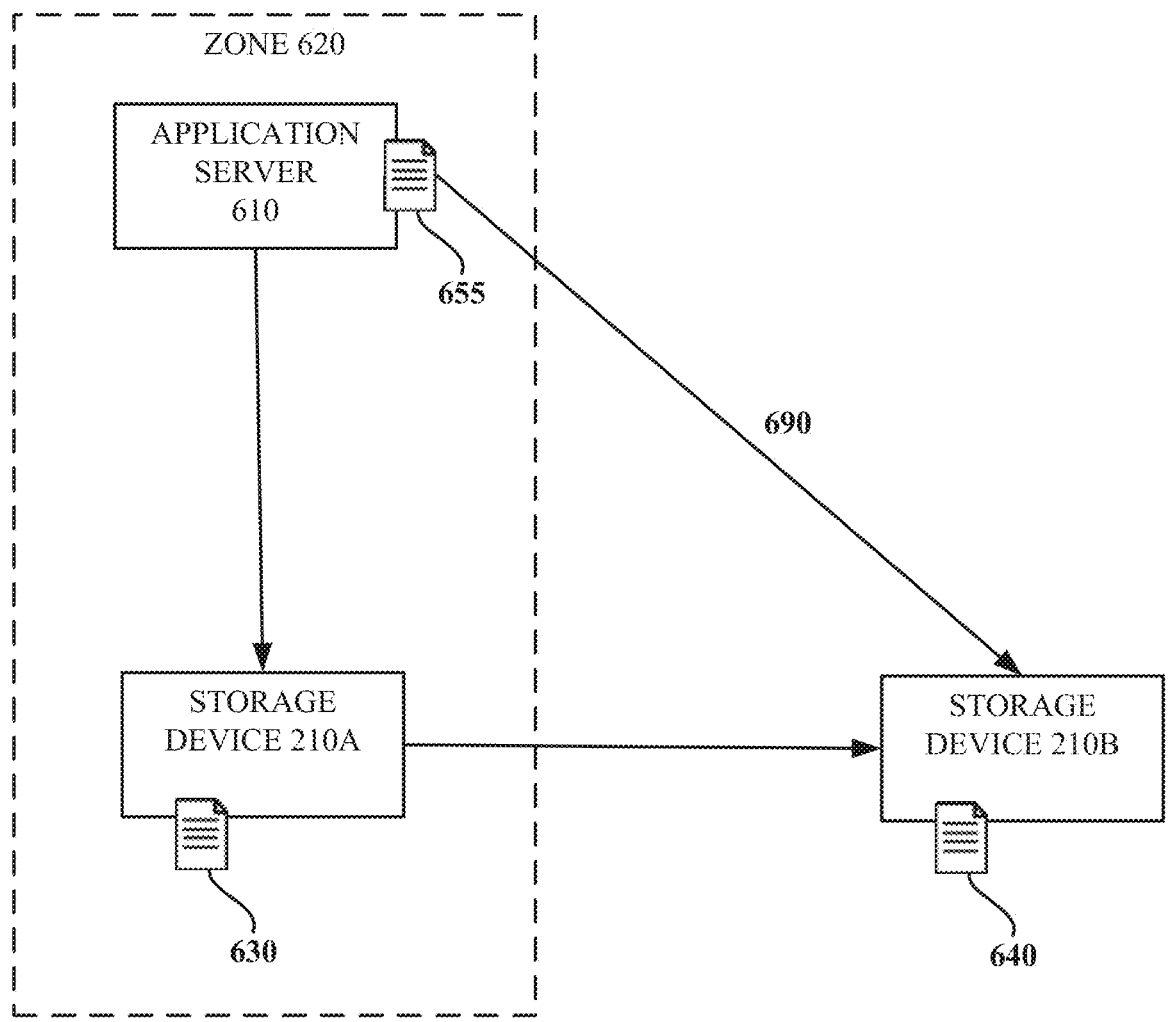
FIG. 6 illustrates an example 600 where application server 610 stores data at storage device 210A in enterprise security zone 620, this data being securely replicated to remote storage device 210B.

FIG. 6 illustrates an example 600 where application server 610 stores data at storage device 210A in enterprise security zone 620, this data being securely replicated to remote storage device 210B, in accordance with one or more embodiments. Repetitive description of like elements and/or processes employed in respective embodiments is omitted for sake of brevity.

In one or more embodiments, as described above, storage device 210A can generate a symmetrical key for communication with storage device 210B, using local characteristics 630 and remote characteristics 640. In additional embodiments to those described above, as depicted in FIG. 6, both storage devices 210A-B can additionally use characteristics from another device, e.g., characteristics 655 of application server 610.

While storage device 210A, being in enterprise security zone 620 with application server 610, can securely receive characteristics 655, in one or more embodiments, storage device 210B also requires characteristics 655 to facilitate the generation of the symmetrical key. In one approach, storage device 210A can use an out-of-band channel to relay this information, an in another approach, application server 610 can relay this information using other communications channels.

Figure 7:
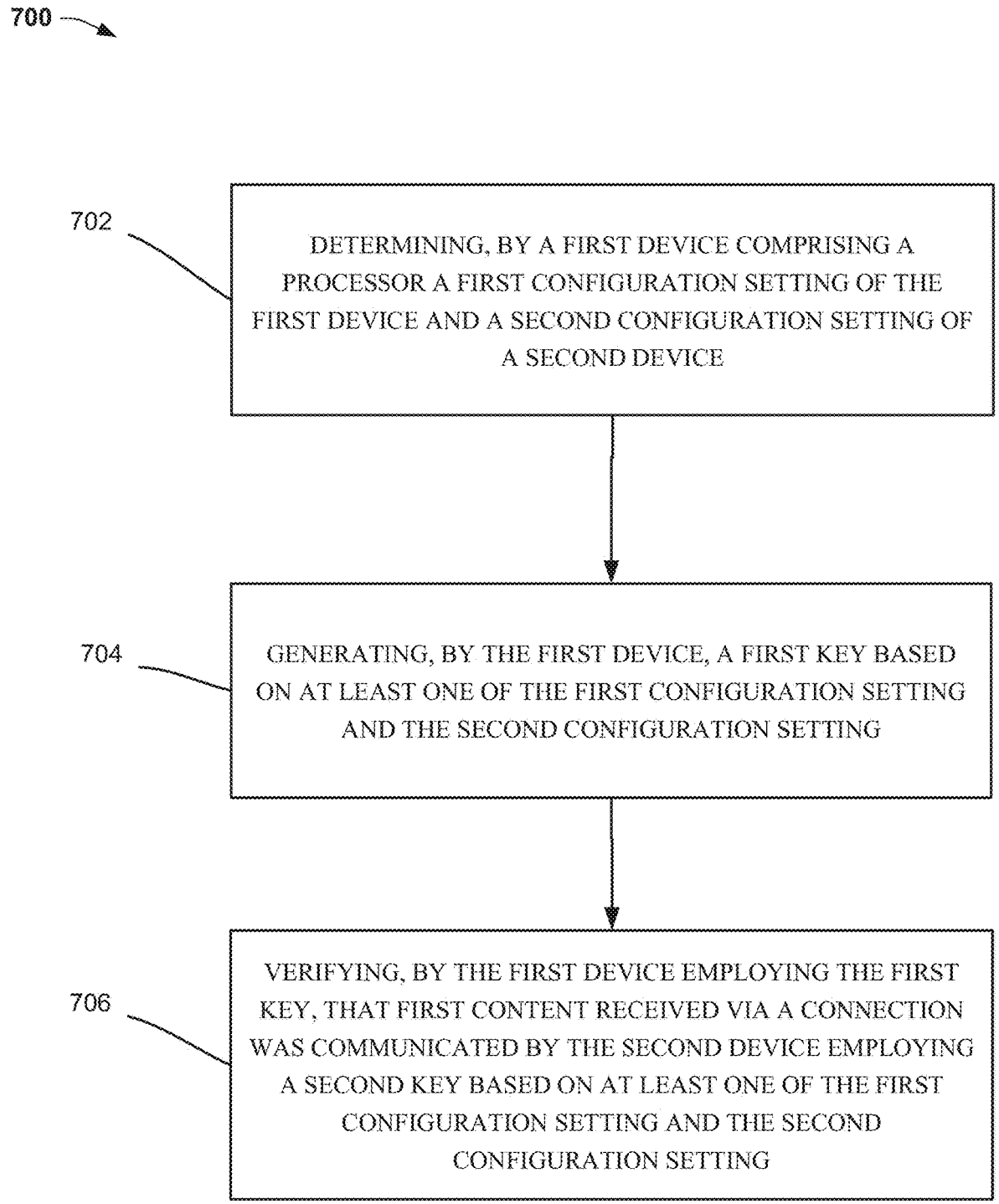
FIG. 7 illustrates an example flow diagram for a method that can facilitate the generating of shared authentication keys using network connection characteristics, in accordance with one or more embodiments.

FIG. 7 illustrates an example flow diagram for a method 700 that can facilitate the generating of shared authentication keys using network connection characteristics, in accordance with one or more embodiments. For purposes of brevity, description of like elements and/or processes employed in other embodiments is omitted.

At element 702, method 700 can comprise determining, by a first device comprising a processor a first configuration setting of the first device and a second configuration setting of a second device. In an embodiment, method 700 can comprise determining, by first device 150 comprising processor 160 a first configuration setting (e.g., setting 177) of first device 150 and a second configuration setting (e.g., configuration setting 365) of second device 180.

At element 704, method 700 can comprise generating, by the first device, a first key based on at least one of the first configuration setting and the second configuration setting. In an embodiment, method 700 can comprise generating, by the first device (e.g., by key generator 124), a first key based on at least one of the first configuration setting and the second configuration setting.

At element 706, method 700 can comprise verifying, by the first device employing the first key, that first content received via a connection was communicated by the second device employing a second key based on at least one of the first configuration setting and the second configuration setting. In an embodiment, method 700 can comprise verifying (e.g., by content authenticator 327), by the first device employing the first key, that first content received via a connection was communicated by the second device employing a second key based on at least one of the first configuration setting and the second configuration setting.

Figure 8:
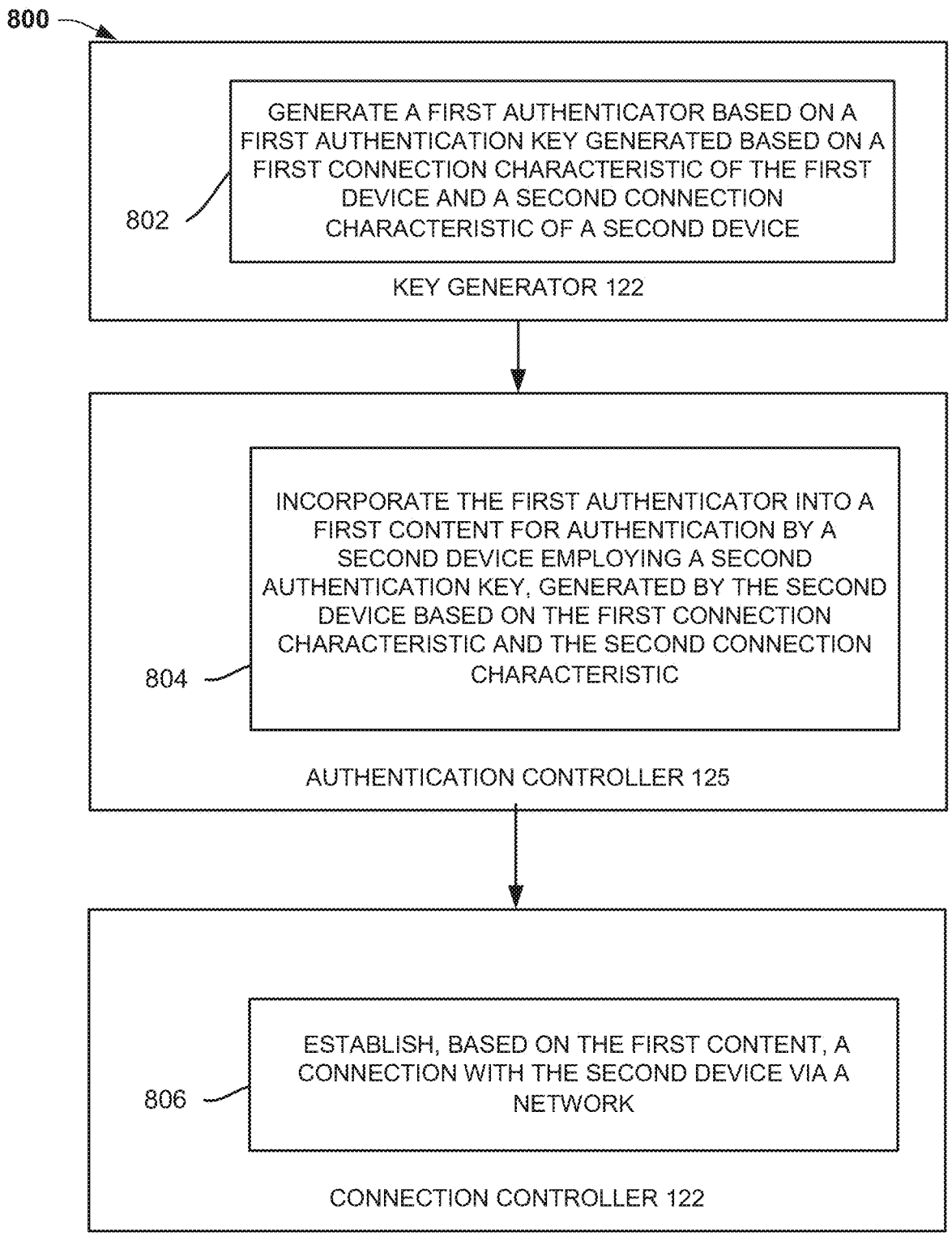
FIG. 8 is a flow diagram representing example operations of a system comprising a key generator, an authentication controller, and a connection controller, that can facilitate the generating of shared authentication keys using network connection characteristics.

FIG. 8 is a flow diagram representing example operations of an example system 800 comprising key generator 124, authentication controller 125, and connection controller 122, that can facilitate the generating of shared authentication keys using network connection characteristics. For purposes of brevity, description of like elements and/or processes employed in other embodiments is omitted.

Key generator 124 can be configured 802 to generate a first authenticator based on a first authentication key generated based on a first connection characteristic of the first device and a second connection characteristic of a second device, in accordance with one or more embodiments. Authentication controller 125 can be configured 804 to incorporate the first authenticator into a first content for authentication by a second device employing a second authentication key, generated by the second device based on the first connection characteristic and the second connection characteristic, in accordance with one or more embodiments. Connection controller 122 can be configured 806 to establish, based on the first content, a connection with the second device via a network, in accordance with one or more embodiments.

Figure 9:
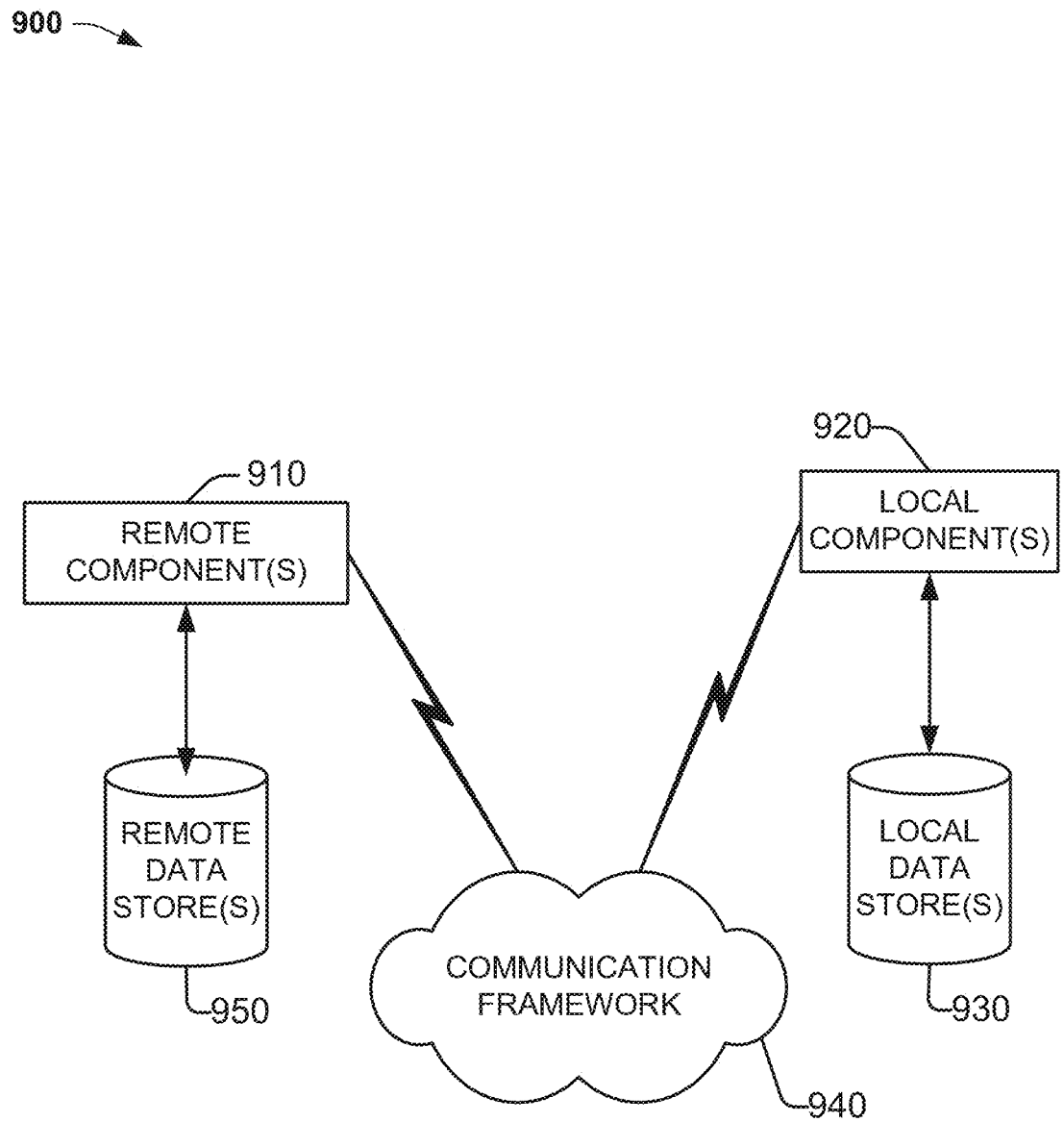
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, FIG. 8, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
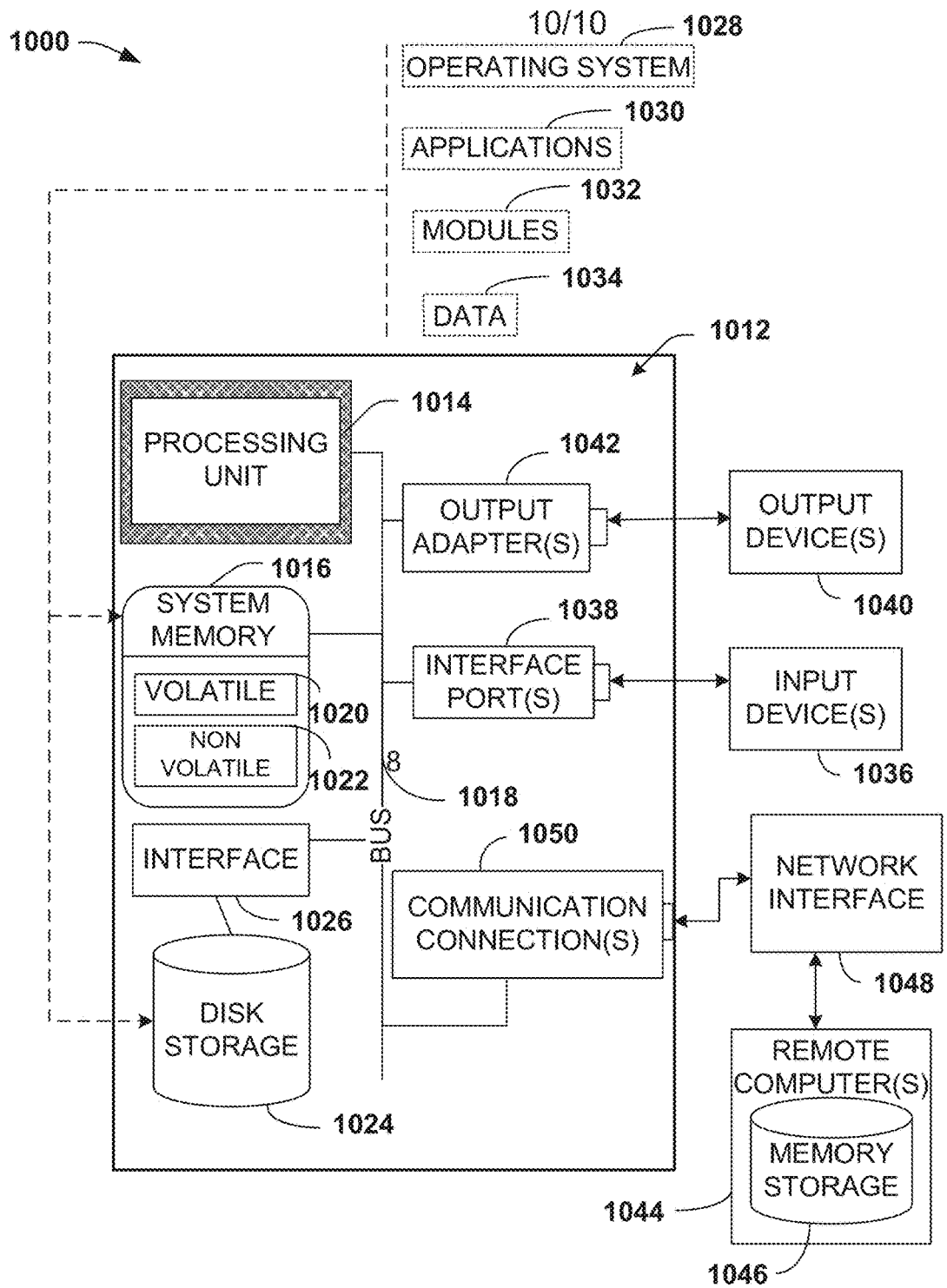
FIG. 10 illustrates an example block diagram of a computing system operable to execute the disclosed systems and methods in accordance with various aspects and implementations of the subject disclosure.

FIG. 10 illustrates a block diagram of a computing system 1000 operable to execute the disclosed systems and methods in accordance with one or more embodiments/implementations described herein. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments described herein are susceptible to various modifications and alternative constructions, certain illustrated implementations thereof are shown in the drawings and have been described above in detail. It should be understood, however, that there is no intention to limit the embodiments to the specific forms disclosed, but on the contrary, the intention is to cover all modifications, alternative constructions, and equivalents falling within the spirit and scope of the one or more embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments described herein are not limited to any single implementation, but rather they are to be construed in breadth, spirit and scope in accordance with the appended claims.

What is claimed is:

1. A device, comprising:
   a processor; and
   a memory that stores executable instructions that, when executed by the processor, facilitate performance of operations, comprising:
   storing, via a first connection, first content in a first storage array device,
   replicating the first content in the first storage array device to a second storage array device via a second connection established between the first storage array device and the second storage array device, by employing a first authentication key generated based on a first connection characteristic of the first connection and a second connection characteristic of the second connection;
   wherein replicating the first content to the second storage array device enables the second storage array device to authenticate the first content by employing a second authentication key, generated by the second storage array device based on the first connection characteristic and the second connection characteristic, wherein the first connection characteristic comprises a characteristic associated with the device, wherein the second connection characteristic comprises a characteristic of a port of the second storage array device, and wherein the second authentication key was generated by a process performed at the second storage array device, and without use of a key shared with the device; and
   establishing, based on the first content, a connection with the second storage array device.

2. The device of claim 1, wherein the second connection characteristic comprises hardware slot configuration information for a component of the second storage array device used for the establishing the connection.

3. The device of claim 1, wherein the second connection characteristic comprises a network address of the second storage array device.

4. The device of claim 1, wherein the operations further comprise authenticating, by employing the first authentication key, second content incorporating an authenticator received via the connection, and wherein the authenticator was incorporated into the second content by the second storage array device employing the second authentication key.

5. The device of claim 1, wherein the operations further comprise:
   detecting a change in at least one of the first connection characteristic or the second connection characteristic, resulting in a modified connection characteristic; and
   changing the first authentication key based on the modified connection characteristic, resulting in a changed first authentication key.

6. The device of claim 5, wherein the operations further comprise notifying the second storage array device regarding at least one of the modified connection characteristic or the changed first authentication key.

7. The device of claim 1, further comprising incorporating the first authentication key into the first content is further for verification, by the second storage array device employing the second authentication key, that the first content was not modified after the first content was communicated by the device.

8. A method performed by instructions stored in a device, comprising:
   storing, by the device comprising a processor, via a first connection, content in a first storage device;
   replicating, by the device, the content in the first storage device to a second storage device via a second connection established between the first storage device and the second storage device, by employing a first authentication key generated based on a first connection characteristic of the first connection and a second connection characteristic of the second connection,
   wherein replicating the content to the second storage device enables the second storage device to authenticate the content by employing a second authentication key generated based on the first connection characteristic and the second connection characteristic, wherein the first connection characteristic comprises a characteristic associated with the device, wherein the second connection characteristic comprises a characteristic of a port of the second storage array device, and wherein the second authentication key was generated by a process performed at the second storage device without use of a key shared with the device; and
   establishing, by the device, based on the content, a connection with the second storage array device.

9. The method of claim 8, wherein the content comprises a first content, and further comprising:
   communicating, by the device employing the first authentication key, new content to the second storage device via the connection for verification, by the second storage device employing the second authentication key, that the device originated communication of the new content.

10. The method of claim 9, wherein the second connection characteristic comprises a hardware characteristic of the second storage device.

11. The method of claim 9, wherein the second connection characteristic comprises an address of the second storage device in a network protocol.

12. The method of claim 8, further comprising:
    detecting, by the device, a change in at least one of the first connection characteristic or the second connection characteristic, resulting in a modified connection characteristic; and
    regenerating the first authentication key based on the modified connection characteristic, resulting in a changed first authentication key.

13. The method of claim 12, wherein detecting the change comprises receiving an indication of a changed second connection characteristic from the second storage device.

14. The method of claim 8, wherein verifying that a second content received via the connection was communicated by the second storage device comprises:
    identifying an authenticating portion of the second content; and
    employing the first authentication key to verify the authenticating portion.

15. The method of claim 8, further comprising, verifying, by employing the first authentication key, that a second content received via the connection was not modified after the second content was communicated by the second storage device.

16. A non-transitory machine-readable medium, comprising executable instructions that, when executed by a processor of a device, facilitate performance of operations, comprising:
    storing, via a first connection, content in a first storage array device; and
    replicating the content in the first storage array device to a second storage array device via a second connection established between the first storage array device and the second storage array device, by employing a first authentication key generated based on a first connection characteristic of the first connection to the first storage array device and a second connection characteristic of the second connection to the second storage array device,
    wherein replicating the content to the second storage array device enables the second storage array device to authenticate the content by employing a second authentication key generated based on the first connection characteristic and the second connection characteristic, wherein the first connection characteristic comprises a characteristic associated with the device, wherein the second connection characteristic comprises a characteristic of a port of the second storage array device, and wherein the second authentication key was generated by a process performed at the second storage array device without use of a key shared with the device.

17. The non-transitory machine-readable medium of claim 16, wherein replicating the content to the second storage array device further enables the second storage array device to verify, by employing the second authentication key, that the content was not modified during the replicating of the content.

18. The non-transitory machine-readable medium of claim 16, wherein the operations further comprise, receiving an indication that the content was:
    replicated by the first storage array device by employing the first authentication key, and
    authenticated by the second storage array device by employing the second authentication key.

19. The non-transitory machine-readable medium of claim 16, wherein the first connection characteristic of the first storage array device comprises a third connection characteristic of the first connection to the device.

* * * * *